United States Patent [19]

Lewandowski

[11] Patent Number: 5,454,937

[45] Date of Patent: Oct. 3, 1995

[54] COLLANT FILTER AND OIL COALESCER

[76] Inventor: Adam F. Lewandowski, 1631 Losey Ave., Jackson, Mich. 49203

[21] Appl. No.: 308,343

[22] Filed: Sep. 19, 1994

[51] Int. Cl.$^6$ .................................................. C02F 1/40
[52] U.S. Cl. .................. 210/104; 210/171; 210/262; 210/300; 210/540; 210/521; 210/DIG. 5
[58] Field of Search .................. 210/104, 168, 210/171, 172, 256, 258, 259, 262, 249, 300, 307, 521, 538, 540, 532.1, 241, DIG. 5

[56] References Cited

U.S. PATENT DOCUMENTS

| | | | |
|---|---|---|---|
| 2,788,126 | 4/1957 | Gardes et al. | 210/262 |
| 3,878,094 | 4/1975 | Conley et al. | 210/DIG. 5 |
| 3,966,136 | 12/1976 | Jakubek et al. | 210/262 |
| 4,361,488 | 11/1982 | White et al. | 210/168 |
| 4,513,614 | 4/1985 | Adcock | 210/168 |
| 4,772,402 | 9/1988 | Love | 210/104 |
| 4,797,205 | 1/1989 | Kitamura | 210/171 |
| 4,980,070 | 12/1990 | Lieberman | 210/DIG. 5 |

*Primary Examiner*—Christopher Upton
*Attorney, Agent, or Firm*—Beaman & Beaman

[57] ABSTRACT

Apparatus for processing machine tool coolants wherein the used coolant fluid includes emulsified oils of light density or the like to be separated from a heavier density metal working fluid such as oil or water. The apparatus also removes particles, bacteria and odor from the processed fluid. Contaminated used coolant is prefiltered of particles prior to passing through a coalescer separation reservoir consisting of a plurality of adjacent configured plates permitting the low density emulsified oils to rise to the surface of the liquid within the separation reservoir. The emulsified oils pass over a weir and are drained away, and the skimmed coolant fluid passes from the separation reservoir to an accumulation reservoir whose level is sensed by a float controlling a pump which removes the coolant fluid from the accumulation reservoir and passes the fluid through a fine activated charcoal filter to complete the processing. A fine adjustment of the level of liquid within the separation reservoir permits an accurate removal of light oils and contaminants with a minimum loss of reusable coolant fluid.

11 Claims, 2 Drawing Sheets

COLLANT FILTER AND OIL COALESCER

BACKGROUND OF THE INVENTION

1. Field of the Invention

The invention pertains to apparatus for processing and cleaning machine tool coolant fluids, and in particular, pertains to the separation of emulsified oil from the coolant fluid and, further, removing particles, bacteria and odors from the fluid.

2. Description of the Related Art

Machine tools utilizing cutters having sharp edges often employ a liquid coolant to cool the tool and work piece. Such coolant is usually pumped and sprayed upon the work piece at the point of contact by the machining tool. The machine tool coolant system normally including a pump supplied from a sump or reservoir associated with the machine tool, and upon the coolant being sprayed upon the cutting tool and work piece, the coolant normally falls to the sump and is recycled.

Machining operations produce chips, grit, and similar foreign matter particles which is continually recycled through the coolant system, and as the coolant may be alternately heated due to contact with a hot tool, and then cooled, and may set in a machine tool sump for extended periods of time without circulation, the coolant becomes contaminated with bacteria producing offensive odors, and such bacteria often becomes an irritant to machine tool operators causing rashes and various health problems.

While large coolant cleaning and processing equipment is known and available, such apparatus is expensive, and is normally only used by large machine tool shops which can afford the expensive coolant processing equipment along with the attendant complex conduit and circulation system required. Small machine tool operators do not have access to permanently installed coolant processing apparatus and, in the past, must periodically discard the contaminated coolant and replace the same with a new fluid, which is expensive, and such maintenance is often overlooked.

Apparatus available to small shop owners for processing and cleaning machine tool coolant fluids is shown in U.S. Pat. No. 4,772,402 of which the instant invention is an improvement. In U.S. Pat. No. 4,772,402, a coolant processing system is disclosed wherein coolant is pumped from a machine tool sump, coarse filtered to remove large chips and similar foreign matter, the pre-filtered coolant is then accumulated and under the control of a float sensor an electrically operated pump forces the pre-filtered coolant through a fine filter which includes activated charcoal which removes bacteria and many odors. After leaving the fine filter, the coolant is returned to the machine tool sump, and as the machine tool coolant is cycled and recycled through the processing apparatus, the coolant is increasingly cleaned and bacteria removed therefrom.

The treating of machine tool coolants by the processing and apparatus shown in U.S. Pat. No. 4,772,402 is suitable for removing chips and other hard foreign matter from the coolant fluid, and reducing bacterial count, but such apparatus is not capable of separating emulsified oil and other light contaminants from the coolant fluid, and in fact, due to the mixing action of the pumps of this patented device, coolant fluid of higher density is intermixed with emulsified oils of lower density, and the deleterious effect of emulsified oil within coolant fluids is magnified and propagated by the apparatus of U.S. Pat. No. 4,772,402.

Undesirable oils, such as emulsified oils, have a lower density than that of the normal coolant and adversely affect the efficiency of the normal coolant fluids. Such emulsified oils may occur from coatings previously applied to the work piece being machined, or may result from a breakdown of the components of the cooling fluid over a period of time due to the exposure of high temperatures at the point of machining. Emulsified oils multiply bacterial growth and odor problems, and are a primary reason for the need to periodically replace coolant fluids. Previously, coolant processing apparatus available to small machine tool operators capable of removing emulsified oils has not been available.

OBJECTS OF THE INVENTION

It is an object of the invention to provide an inexpensive coolant processing system for machine tools wherein the apparatus is capable of removing foreign matter particles from a coolant fluid, reducing coolant bacteria, and is also capable of separating light density contaminating liquids such as emulsified oil from the higher density recyclable coolant fluid.

A further object of the invention is to provide apparatus for processing machine tool coolant fluids which is of an inexpensive construction, requires unskilled operators, is capable of separating low density fluid contaminants from the higher density coolant fluid, and whose operation is automatic, and once initiated, requires a minimum of attention from the operator.

An additional object of the invention is to provide a coolant fluid processing apparatus for machine tool coolants wherein low density fluid contaminants are removed from the coolant fluid by coalescing apparatus, and wherein the separation of low density contaminants is accomplished in an effective manner by low cost apparatus.

SUMMARY OF THE INVENTION

The machine tool coolant processing apparatus in accord with the invention preferably includes a frame mounted upon wheels so as to be portable. The lower portion of the apparatus includes a pair of electrically operated pumps, and an accumulation reservoir is defined upon the frame lower portion adjacent the pumps.

A separation reservoir is mounted upon the upper portion of the frame at a higher elevation than the accumulation reservoir, and the separation reservoir includes an inlet and a spaced outlet defining a fluid flow path therebetween wherein fluid introduced into the separation reservoir at the inlet is, eventually, drained from the separation reservoir through a vertically adjustable outlet in the form of an overflow standpipe. Intermediate the separation reservoir inlet and outlet, a light density fluid separator is located which consists of a plurality of closely spaced plates having an intermeshing and honeycomb configuration which impedes and slows movement of the coolant fluid therethrough, which permits the lighter density components of the coolant fluid to rise to the surface of the separator wherein such low density components, such as emulsified oil, pass over a weir and are drained from the separation reservoir.

By closely controlling the vertical height of the separation reservoir outlet standpipe, the depth of fluid flowing over the weir can be closely controlled, and coolant fluid which has been skimmed will flow into the outlet standpipe into the accumulation reservoir located in the frame below. The amount of coolant fluid accumulating in the accumulation reservoir is sensed by a float operating an electric switch which controls a pump supplied from the accumulation reservoir which forces coolant fluid through a fine filter which includes activated charcoal for removing bacteria and odors from the coolant. After passing through the fine filter, the coolant is returned to the machine tool sump and continues to be recycled, and cleansed.

The other pump mounted upon the apparatus frame draws coolant fluid from the machine tool sump and pumps coolant fluid to the separation reservoir. The separation reservoir includes a prefilter or coarse filter consisting of a porous bag or the like wherein large chips and other particles contained within the coolant fluid are removed prior to the coolant fluid passing through the separator, and if the sump coolant contains a high ratio of particles, a coarse filter can be used in the pump circuit drawing coolant from the machine tool sump to remove large particles before the coolant is pumped to the porous bag.

Machine tool coolant fluid processing apparatus in accord with the invention is inexpensive to fabricate and operate, and is capable of efficiently separating high density and low density fluids within coolant fluid, and is also capable of reducing bacteria and odor within machine tool coolants.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
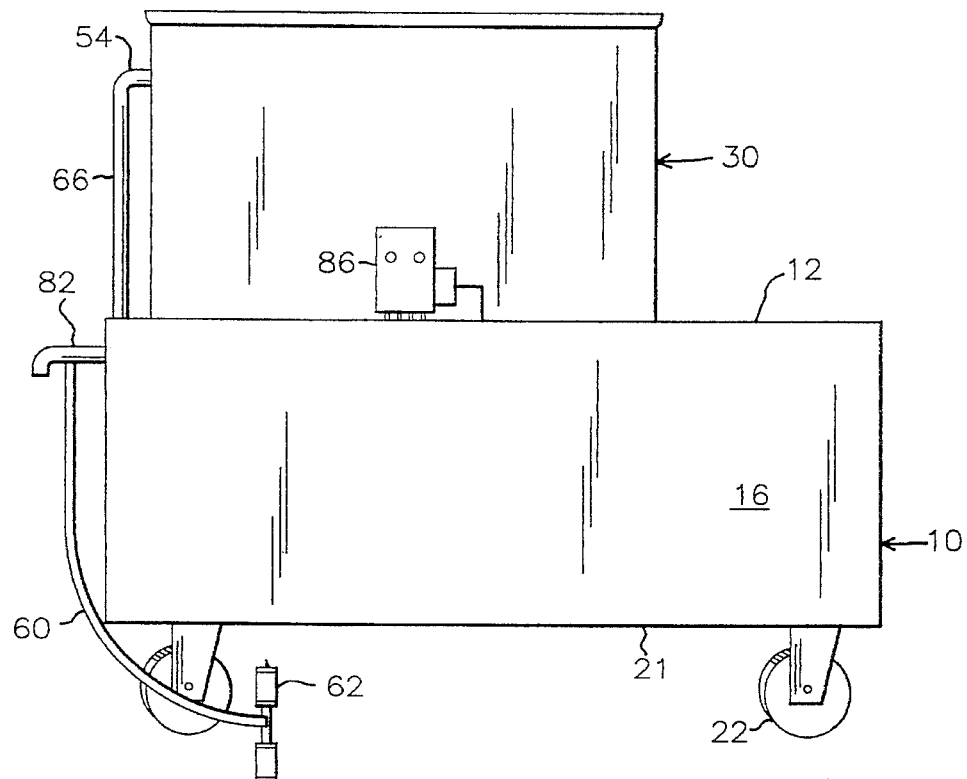
FIG. 1 is a front elevational view of coolant fluid processing apparatus in accord with the invention.
Figure 2:
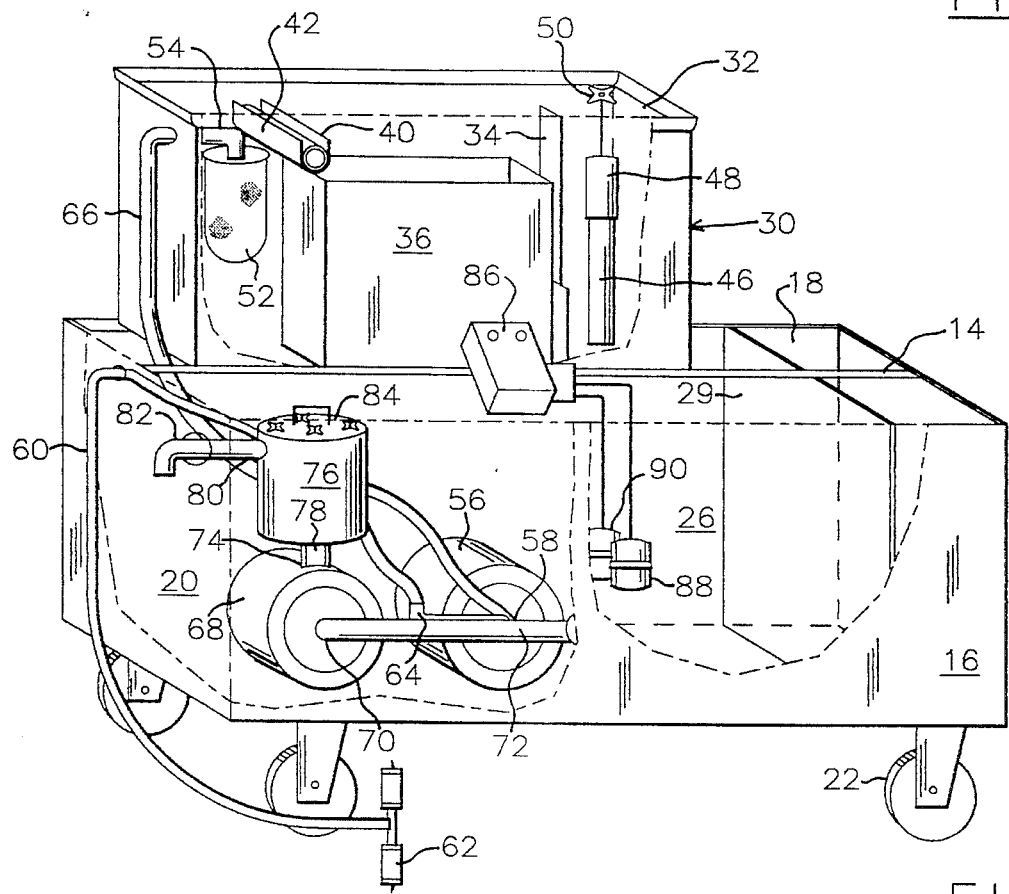
FIG. 2 is a perspective cutaway view of the apparatus in accord with the invention illustrating basic components.

With reference to the figures, the apparatus of the invention includes a rectangular frame 10 having an open upper portion 12. An upper brace 14 extends around the frame adjacent the upper portion 12, and the frame front panel 16 is in a spaced parallel relation to the rear panel 18. The ends of the frame are enclosed by end panels 20, and the frame includes a closed bottom 21. The frame 10 is preferably mounted upon wheels 22 wherein the unit is portable.

A pump chamber 24 is defined within the frame 10, and an accumulation reservoir 26 is also defined on the frame. The partition 28 separates the pump chamber 24 from the accumulation reservoir 26. Further, an auxiliary reservoir 27 is defined adjacent accumulation reservoir 26 by partition 29.

Figure 4:
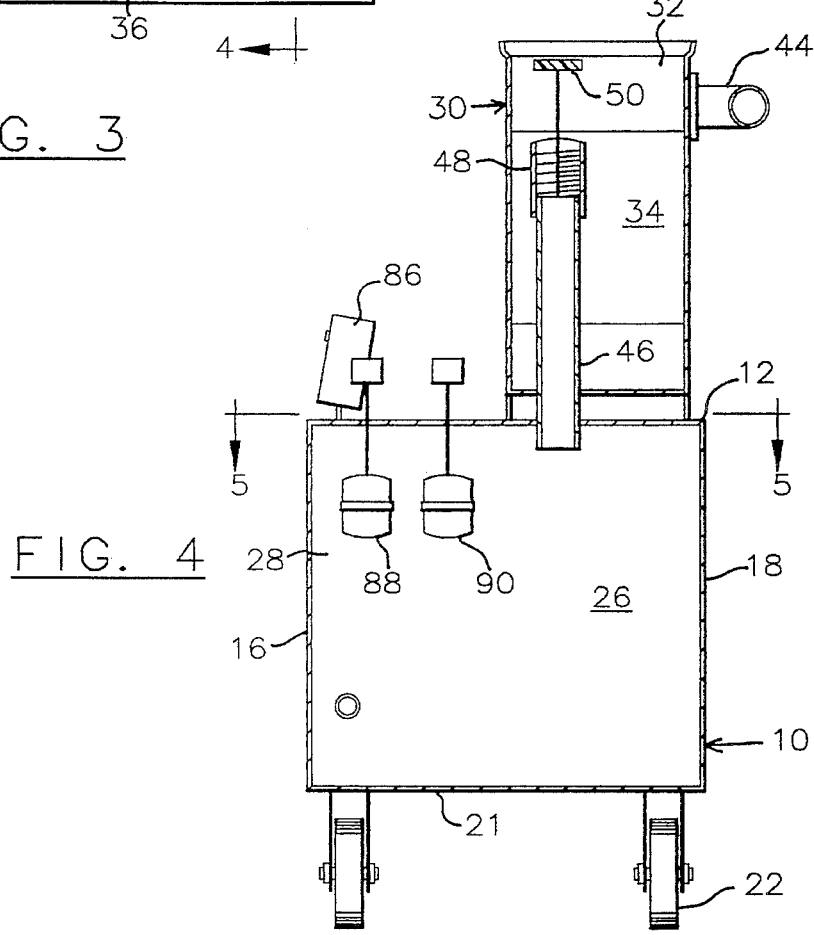
FIG. 4 is an end elevational sectional view taken through the entire apparatus along the section line illustrated at 4—4 of FIG. 3.
Figure 5:
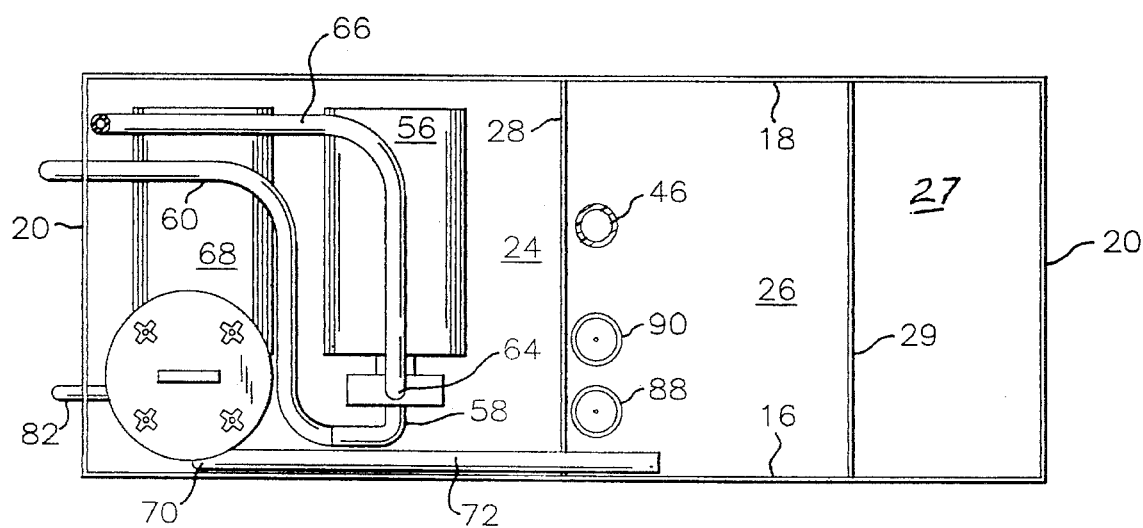
FIG. 5 is a plan sectional view as taken along Section 5—5 of FIG. 4 illustrating the frame and associated components.

A separation reservoir 30 is mounted upon the frame upper portion 12 above the pump chamber 24 and the accumulation reservoirs 26 and 27. The separation reservoir 30 is of a rectangular configuration having an open top 32 and is approximately two-thirds the length of the frame 10, and approximately one-half the width of the frame as will be appreciated from FIG. 4.

The rectangular separation reservoir 30 includes a partition 34 which extends adjacent the open top 32, but does not extend to the bottom of the reservoir 30.

A separator 36 is located within the separation reservoir 30 for separating light density emulsified oils or other floatable material from the cooling liquid, which may consist of oil, water or the like. The separator 30 consists of a plurality of zigzag intermeshing plates 38 closely spaced from each other which may be formed of metal or synthetic plastic material. The plates 38 constitute a coalescing media, and the plates extend adjacent to the bottom of the separation reservoir 30, and the upper edges of the plates 38 are below the reservoir top 32. The partition 34 separates the plates 38 from the right outlet portion of the separation reservoir 30, and as the partition 34 does not extend to the bottom of the reservoir 30, the cooling fluid passing through plates 38 will enter the outlet portion of the separator reservoir.

Figure 3:
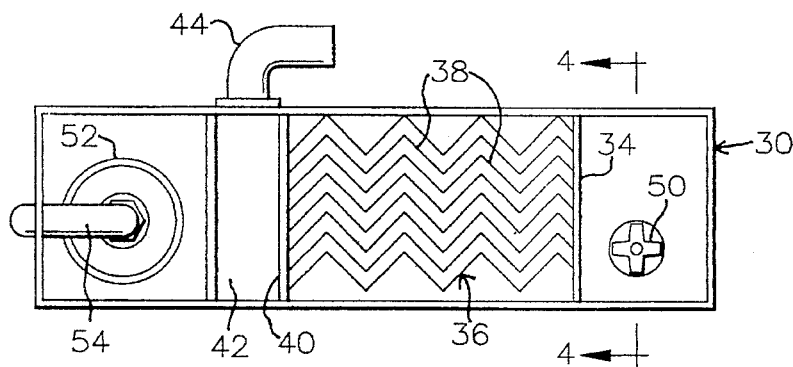
FIG. 3 is a top plan view of the separation reservoir, per se.

At its left portion, FIG. 3, the separator 36 includes a weir edge 40 defined in a U-shaped weir bracket 42 wherein light density material rising to the liquid surface within the separator 36 will flow over the weir edge 40 into the weir bracket 42, and the weir bracket 42, which is of a U-shape, includes an outlet 44 whereby the light density materials may flow from the separation reservoir 30 and be collected for disposal or recycling.

The liquid level within the separation reservoir 30 is controlled by an outlet standpipe 46 located in the right portion of the separation reservoir 30, FIG. 3, which extends through the bottom of the reservoir 30. The outlet pipe 46 is vertically oriented and its open lower end communicates with the frame accumulation reservoir 26 as will be apparent from FIG. 4. The upper end of the outlet pipe 46 is threaded, and the outlet pipe may be formed of a synthetic plastic material.

A tubular outlet extension cap 48 is threaded upon the upper end of the pipe 46 and a handle 50 is mounted upon the cap 48 whereby rotation of the handle 50 will rotate the cap and vertically position the cap upon the outlet pipe 46. Fluid within the separation reservoir 30 adjacent the cap 48 will flow over the top edge of the cap into the pipe 46 and flow into the accumulation reservoir 26. Accordingly, it will be appreciated that rotation of the handle 50 is used to raise and lower the cap 48 to closely control the liquid level within the separation reservoir 30.

Fluid is introduced into the separation reservoir 30 through a coarse filter which comprises a filter bag 52 located in the left end of the separation reservoir 30, FIG. 3. An inlet fitting 54 is disposed above the filter bag 52 wherein fluid may be pumped into the reservoir 30 through the fitting 54 and the coarse filter bag 52.

It will be appreciated that as the separator 36 extends the width of the separation reservoir 30, and is located between the filter bag 52 and the outlet pipe 46 that fluid entering the separation reservoir 30 will flow through the separator 36 and plates 38, and the zigzag intermeshing pattern of the plates 38 produces a maze which slows the velocity of the fluid flow through the separator permitting the light density constituents to rise to the surface of the separator 36 at the plates 38. These light density materials usually consist of emulsified oils which will flow over the weir 40 and into the weir bracket 42 for collection through a conduit, not shown, connected to weir outlet 44.

As the fluid level within the separation reservoir 30 is closely controlled by regulating the vertical position of the outlet pipe cap 48, the vertical thickness of the fluid flowing over the weir 40 may be accurately regulated. After passing through the separator 36, the cooling fluid-flows under the partition 34 into the chamber containing the outlet pipe 46, and such fluid is free of coarse particles such as metal and the like in view of the filtering at the bag filter 52, and the fluid is also substantially free of low density contaminants such as emulsified oil which has been separated from the primary body of fluid by the separator 36.

The fluid flowing from the separation reservoir 30 to the frame accumulation reservoir 26 through the outlet pipe 46 will increase in depth in reservoir 26, and upon a pre-determined depth of fluid being reached within the accumulation reservoir 26, a combination electric motor and pump unit will be energized as described below.

A combination electric motor and pump unit 56 located in frame chamber 24 includes a pump inlet 58 which communicates with an inlet hose 60 passing through a frame end panel 20 having an inlet float 62 at its end which is placed within the machine tool fluid sump, or the like, not shown, whereby the fluid to be processed by the apparatus is drawn into the processing apparatus through the inlet 62 by the pump 56. The pump outlet 64 is connected by a conduit 66 to the fitting 54 supplying fluid to the filter bag 52, and it will be appreciated that the pump 56 draws the coolant from the machine tool whose cooling fluid is to be processed and supplies the fluid to the separation reservoir 30 which, in turn, flows into the accumulation reservoir 26.

The electric motor and pump unit 68 located within frame chamber 24 includes an inlet at 70 which is connected to a conduit 72 which is in communication with the frame accumulation reservoir 26. The pump 68 includes an outlet 74 which is connected to the fine filter 76 through a conduit 78. The fine filter 76 includes a filter outlet 80 communicating with an outlet conduit 82 whereby a hose attached to the outlet conduit 82 may be used to return the filtered processed coolant to the machine tool sump from which float inlet 62 is being supplied.

The fine filter 76 preferably contains particulate activated charcoal wherein bacteria and odors will be removed as they pass through the filter. The filter 76 includes an access cap 84 mounted upon the filter by wing nuts to permit cleaning and servicing, and the filter 76 may be substantially identical to the similar fine filter shown in U.S. Pat. No. 4,772,402.

Operation of the aforedescribed apparatus is controlled through a control box 86 mounted upon the frame 10 and the control box includes switches which initiate the operation by energizing pump 56, and the control box 86 is also controlled by a float 88, through appropriate switches and relays. The float 88 is located within the accumulation reservoir 26 wherein upon a pre-determined liquid level being attained within reservoir 26, the motor 68 will be energized to draw fluid from the reservoir 26. Accordingly, the operation of the unit may cycle on and off depending on the rate of fluid flow through the separation reservoir 30 and accumulation reservoir 26, and coarse and fine filters.

A second float 90 is preferably located within the accumulation reservoir 26 adjacent float 88, and connected to appropriate controls in association with control box 86 wherein should the pump 68 not empty the accumulation reservoir 26 as intended, the float 90 will terminate the apparatus operation to prevent overflowing of the accumulation reservoir 26.

In the event that the coolant within the machine tool sump has a particularly high percentage of foreign matter particulate contained therein, an additional coarse particle pre-filter may be located within the intake system of pump 56. In such instance, the inlet hose 60 will be connected to such a cleanable pre-filter so that particles will not reach the pump 56 and the pump 56 will draw from such pre-filter. When using such a pre-filter connected to the inlet of pump 56, the floatable inlet 62 may not be used.

It will be appreciated that the apparatus of the invention achieves the objects of the equipment shown in U.S. Pat. No. 4,772,402 wherein machine tool coolant is both coarse filtered and fine filtered, and in addition, the apparatus of the invention permits light density contaminants such as emulsified oils to be removed from the coolant fluid, and by closely controlling the liquid level within the separation reservoir, the efficiency of the separator 36 can be closely regulated by determining the depth of the fluid flowing over the weir 40.

It is appreciated that various modifications to the inventive concepts may be apparent to those skilled in the art without departing from the spirit and scope of the invention.

I claim:

1. Machine tool coolant processing apparatus for cleaning a coolant fluid and separating the coolant fluid from oils having a lower density comprising, in combination, a frame having an upper portion, an accumulation reservoir defined on said frame below said upper portion, first and second electrically operated pumps mounted on said frame each having an inlet and an outlet, a separation reservoir mounted on said frame upper portion, an inlet and an outlet defined in said separator reservoir, said separation reservoir inlet and outlet being spaced from each other and a liquid flow path defined therebetween, a coolant fluid and oil separator located within said separation reservoir within said flow path between said separation reservoir inlet and outlet, said separator including a horizontal weir whereby oils having a lighter density than the coolant fluid flow over said weir, a discharge conduit receiving oils flowing over said weir removing said oils from said separator and said separation reservoir, said separation reservoir outlet communicating with said accumulation reservoir, a first conduit connected to said first pump inlet for receiving coolant to be processed, a second conduit connected to said first pump outlet in communication with said separation reservoir inlet, a fine filter mounted on said frame having an inlet and an outlet, a third conduit connecting said second pump inlet to said accumulation reservoir, a fourth conduit connecting said second pump outlet to said fine filter inlet, a fifth conduit attached to said fine filter outlet for supplying processed coolant, and control means for said second pump sensing the coolant level within said accumulation reservoir and controlling operation of said second pump in accordance with the coolant level within said accumulation reservoir.

2. In machine tool coolant processing apparatus as in claim 1, a coarse filter located within said separation reservoir in communication with said separation reservoir inlet, said coarse filter removing larger foreign matter particles from the liquid pumped by said first pump.

3. In machine tool coolant processing apparatus as in claim 2, said coarse filter comprising a porous bag receiving the liquid flowing from said separation reservoir inlet into said separation reservoir.

4. In machine tool coolant processing apparatus as in claim 1, said coolant fluid and oil separator comprising a liquid flow baffle to slow liquid flow along said liquid flow path permitting low density oils to rise to the surface of the liquid within said separator and flow over said weir.

5. In machine tool coolant processing apparatus as in claim 4, said liquid flow baffle comprising a plurality of adjacent closely spaced plates.

6. In machine tool coolant processing apparatus as in claim 5, wherein said plates are of a parallel honeycomb configuration.

7. In machine tool coolant processing apparatus as in claim 1 wherein said control means include a float located within said accumulation reservoir.

8. In machine tool coolant processing apparatus as in claim 1, adjustment means supporting said separation reservoir outlet for vertical adjustment whereby vertical adjustment thereof adjusts the level of liquid within said separation reservoir and the depth of the liquid flowing over said weir.

9. In machine tool coolant processing apparatus as in claim 8, said separation reservoir outlet comprising a vertically disposed standpipe having a lower end in communication with said accumulation reservoir and having an upper threaded end, a tubular extension threaded upon said standpipe upper end having an open upper end, rotation of said extension vertically adjusting said extension, the level of liquid within said separation reservoir being determined by the vertical position of said extension open upper end which constitutes an over flow outlet for said separation reservoir.

10. In machine tool coolant processing apparatus as in claim 9, a vertically extending operating handle affixed to said standpipe threaded extension to facilitate rotation of said extension.

11. In machine tool coolant processing apparatus as in claim 1, said fine filter comprising a closed receptacle, and an activated charcoal bed within said receptacle filtering coolant pumped therethrough.

\* \* \* \* \*